(12) United States Patent
Dincan et al.

(10) Patent No.: US 12,410,775 B2
(45) Date of Patent: Sep. 9, 2025

(54) WIND TURBINE WITH INTEGRATED HYDROGEN GENERATION

(71) Applicant: VESTAS WIND SYSTEMS A/S, Aarhus N. (DK)

(72) Inventors: Catalin Gabriel Dincan, Gistrup (DK); Rui Wu, Aarhus N (DK); Philip Carne Kjær, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/922,543

(22) PCT Filed: Apr. 23, 2021

(86) PCT No.: PCT/DK2021/050127
§ 371 (c)(1),
(2) Date: Oct. 31, 2022

(87) PCT Pub. No.: WO2021/219182
PCT Pub. Date: Nov. 4, 2021

(65) Prior Publication Data
US 2023/0167804 A1    Jun. 1, 2023

(30) Foreign Application Priority Data

Apr. 30, 2020   (DK) .......................... PA 2020 70270

(51) Int. Cl.
*F03D 9/00*   (2016.01)
*F03D 9/19*   (2016.01)

(52) U.S. Cl.
CPC ............ *F03D 9/19* (2016.05); *F05B 2220/61* (2013.01); *F05B 2260/42* (2013.01)

(58) Field of Classification Search
CPC .... F03D 9/19; F05B 2220/61; F05B 2260/42; Y02E 10/72; Y02E 60/36; Y02E 70/30
See application file for complete search history.

(56) References Cited

U.S. PATENT DOCUMENTS 6,104,097 A      8/2000  Lehoczky
7,471,010 B1 *  12/2008  Fingersh ................. F03D 9/11
                                                            290/43

(Continued)

FOREIGN PATENT DOCUMENTS

CN      109899236 A       6/2019
DE    102012208547 A1    11/2013

(Continued)

OTHER PUBLICATIONS

Search Opinion for Danish Patent Application No. PA 2020 70270, dated Oct. 27, 2020, 3 pages.

(Continued)

*Primary Examiner* — Julio C. Gonzalez
(74) *Attorney, Agent, or Firm* — Patterson + Sheridan, LLP; Gero G. McClellan

(57) ABSTRACT

An off-grid wind turbine system comprising a wind turbine with an electric generator for generating an initial electric power output. An electrolyzer system with a hydrogen electrolyzer located inside the nacelle or tower of the wind turbine, so as to generate hydrogen by an electrolysis process. An electric converter system serves to convert the initial electric power output into a DC electric power output dedicated for powering the electrolyzer. The produced hydrogen is stored in a hydrogen storage tank.

19 Claims, 9 Drawing Sheets

(56) References Cited

U.S. PATENT DOCUMENTS

| | | | |
|---|---|---|---|
| 2006/0125241 A1* | 6/2006 | DuHamel | F03D 9/25 290/44 |
| 2007/0145748 A1 | 6/2007 | Pierz | |
| 2007/0267874 A1* | 11/2007 | Taylor | F03D 9/25 290/55 |
| 2018/0287461 A1* | 10/2018 | Coman | F03D 3/005 |

FOREIGN PATENT DOCUMENTS

| | | | |
|---|---|---|---|
| DE | 202018105845 U1 * | 12/2018 | |
| DE | 102018125238 A1 | 4/2020 | |
| FR | 505949 A | 8/1920 | |
| WO | 2006097494 A1 | 9/2006 | |
| WO | 2015192877 A1 | 12/2015 | |

OTHER PUBLICATIONS

Search Report for Danish Patent Application No. PA 2020 70270, dated Oct. 27, 2020, 4 pages.
International Search Report for PCT Application No. PCT/DK2021/050127, dated Nov. 4, 2021, 4 pages.
Written Opinion of the International Searching Authority for PCT Application No. PCT/DK2021/050127, dated Nov. 4, 2021, 5 pages.
Information on Search Strategy for PCT Application No. PCT/DK2021/050127, dated Nov. 4, 2021, 1 page.
Office Action received for European Patent Application No. 21725695.7, mailed on Mar. 25, 2025, 4 pages.

* cited by examiner

WIND TURBINE WITH INTEGRATED HYDROGEN GENERATION

FIELD OF THE INVENTION

The present invention relates to the field of electric energy generating based on wind turbines, more specifically to the field of wind turbines dedicated for generation of electric power for powering an electrolyzer system for hydrogen generation. Specifically, the invention relates to a wind turbine with integrated hydrogen generation.

BACKGROUND OF THE INVENTION

Storing of energy generated by renewable energy sources, e.g. wind turbines, is a general problem. Generation of hydrogen by means of electrolysis, i.e. based on electrical power, is one solution. Stored hydrogen can be used e.g. for fuel cells, such as in hydrogen driven vehicles, for steel industries, aviation, maritime, trains, heavy industries, heating systems or grid size storage.

However, even though generation of hydrogen based on electrical power from the grid provides a flexible solution to the problem of storing of energy, such solutions often provide a poor efficiency, since the route of electrical power from the source to a hydrogen electrolyzer facility is often complex and involves many electrical components such as cables, switches and voltage conversion components, each contributing to power loss.

Even further, the complex electrical system involved in hydrogen production based on e.g. wind turbine power causes such hydrogen generation to be expensive.

SUMMARY OF THE INVENTION

Thus, according to the above description, it is an object of the present invention to provide an efficient and yet low cost solution for utilizing wind power for generation of hydrogen.

In a first aspect, the invention provides an off-grid wind turbine system comprising
  a wind turbine comprising a tower, a nacelle, and a blade system arranged to drive an electric generator for generating an initial electric power output,
  an electrolyzer system comprising an electrolyzer arranged to generate hydrogen to a hydrogen output by an electrolysis process, wherein at least part of the electrolyzer is located inside the wind turbine,
  an electric converter system arranged to convert the initial electric power output into a DC electric power output dedicated for powering the electrolyzer, and
  a hydrogen storage system comprising a hydrogen storage tank arranged to receive hydrogen from the hydrogen output in order to store hydrogen generated by the electrolyzer system.

The invention is based on the insight that hydrogen generation based on electric power from wind turbines is inefficient and expensive due to the expensive and electrically complex wind turbines required for generation of electric power to the grid. The wind turbine system according to the invention is advantageous, since it allows wind turbines with a rather simple electrical system compared to wind turbines for power production to the grid, leading to a lower capital expenditures and higher energy production. A dedicated electrical converter solution between the electric generator in the wind turbine and the hydrogen electrolyzer can be designed for optimal efficient transformation of produced electrical power for hydrogen generation. Several concepts for conversion of power will be described which provide efficiency and/or cost and/or occupation of space advantages compared existing wind turbine designs.

By at least partially integrating components of hydrogen generation with the wind turbine, mechanical components can be saved, and thus further helps to provide a simple and efficient wind-to-hydrogen facility. Further, local hydrogen generation in or at least near the wind turbine reduces electric power loss in long distance cables.

By "located inside the wind turbine" is understood located inside the nacelle and/or located inside the tower. Thus, at least a part of the electrolyzer may be located inside the nacelle or inside the tower, or the electrolyzer may be partly located inside the nacelle and partly inside the tower. Still further, the entire electrolyzer may be located inside the nacelle or located inside the tower.

By "off-grid" is understood a wind turbine which is not connected so as to allow generation of electric power to the electric grid according to a standard grid code and involving switchgear etc. However, still the wind turbine may be connected to the grid for receiving power to power auxiliary systems necessary for operation of the wind turbine, e.g. in cases where the wind turbine is unable to generate electric power for maintaining its basic operation. Additionally, if no electric grid is present, auxiliary power systems will be local energy storage systems as batteries or hydrogen fuel-cells.

A separate housing with at least a part of components related to hydrogen generation and hydrogen storage may be located adjacent to the wind turbine, i.e., at a distance less than 100 m from the wind turbine tower, such as a location on the ground next to the wind turbine tower, e.g. in a container or the like, or a housing built together with wind turbine tower.

In the following, preferred features and embodiments will be described.

The electric converter system may be arranged to convert the initial electric power output from the electric generator into the DC electric power output dedicated for powering the electrolyzer in one single conversion step. Hereby, a simple and compact converter design can be used.

The initial electric power output from the electric generator may be an AC output, e.g. such as the electric generator being a Permanent Magnet (PM) synchronous generator type designed for generation of an electric AC output with one, two or three phases.

In some embodiments, the electric is a synchronous generator excited by an external exciter. Such generator can provide an electric output which allow a simplified converter system to be used.

In preferred embodiments, the electrolyzer is located inside the nacelle. Thus, in such embodiments a compact without the need for high power rated electric power cables inside the tower. Instead hydrogen pipe inside the tower to bring hydrogen generated in the nacelle down tower, e.g. for storage in a tank adjacent to the wind turbine or inside the tower of the wind turbine. In such solutions, a compressor located inside the wind turbine, e.g. inside the nacelle, is preferably connected to the hydrogen output of the electrolyzer in order to generate a hydrogen output with a moderate to high pressure for transporting hydrogen away from the wind turbine for storage.

The hydrogen storage tank may be located adjacent to the wind turbine, such as the hydrogen storage tank being located on the ground adjacent to the tower, or such as the hydrogen storage tank being located in the underground, e.g. below the wind turbine tower. Hydrogen outputs from a plurality of wind turbines may be connected via a pipe system to one common storage tank located adjacent to the wind turbines, or located remotely from at least some of the plurality of wind turbines.

In some embodiments, the wind turbine is located off-shore while the hydrogen storage tank is located on-shore. This allows a simple off-shore design, since no off-shore storage tank is required. Rather, hydrogen is transported in a pipe system from off-shore to on-shore, e.g. in one single pipe connected to hydrogen outputs from a plurality of wind turbines off-shore.

It may be preferred that a hydrogen pipe is arranged inside the tower for transporting compressed hydrogen from an output of the compressor to the hydrogen storage tank, Especially, the hydrogen pipe inside the tower is connected to a hydrogen pipe system arranged to transport to the hydrogen storage tank located at a remote location of the wind turbine.

In the following, various concepts for dedicated electric conversion from the initial electric power generated by the electric generator to a suitable DC electric power output to be applied to the hydrogen electrolyzer.

In Concept A, an AC to DC converter serves to convert the initial electric power output from the electric generator into the DC electric power output for powering the electrolyzer, and wherein both of the AC to DC converter and the electrolyzer are located inside the nacelle. Concept A is advantageous e.g. due to the fact that a simple power architecture with fewer power conversion stages can be used, and further Concept A can be implemented by means of standard components that already exist, Especially, the AC to DC converter and at least part of the electrolyzer are integrated so as to form one unit. More specifically, at least two such separate units may be located inside the nacelle, wherein each unit comprises an AC to DC converter and an electrolyzer, e.g. wherein the electric generator is located in the centre of the nacelle, while separate units each having an AC to DC converter and an electrolyzer are placed to the sides of the electric generator.

In Concept B, a torque converter, e.g. a hydraulic torque converter, is mechanically connected between the blade system and the electric generator, wherein the electric generator is a synchronous generator excited by an external exciter, and wherein the electrolyzer and the electric converter system are located inside the nacelle. Concept B is advantageous, since the torque converter allows a simple converter system to be used, e.g. using passive diodes, thus providing a low cost and robust converter system. Most preferably, Concept B is used at Low Voltage levels. Further to Concept B, in Concept C, the electric converter system comprises a series connection of a transformer and an AC to DC converter, such as an AC to DC converter comprising passive diodes. Concept C is advantageous over Concept B in that it is suitable for Medium Voltage levels, thus increasing power rating and reduces cost and power loss in electric cables in the tower.

In Concept D, the electric converter system comprises an AC to DC converter arranged to convert the initial electric power output from the electric generator into an intermediate DC electric power output, and wherein a DC to DC converter serves to convert the intermediate DC electric power output into the DC electric power output for powering the electrolyzer. Concept D is advantageous, e.g. in that it allows the DC to DC converter to up-convert DC voltage level, e.g. to sa Medium Voltage level, e.g. +/−50 kV DC, for transmitting electric power to the electric grid at higher power ratings, e.g. up to 15 MW, and use of a medium frequency transformer will help to reduce cost and weight of magnetic material, even further a high annual energy production can be expected due to the high efficiency topology. Especially, the electric converter system and the electrolyzer may be located inside the nacelle, and wherein the DC electric power output for powering the electrolyzer is a Low Voltage DC level. Especially, the electrolyzer may be located inside the tower, and wherein the DC electric power output for powering the electrolyzer is a Medium Voltage DC level. Still further, the electrolyzer may be powered by the intermediate DC voltage provided by the AC to DC converter, while the DC to DC converter serves to up-convert to a Medium Voltage DC level for connection to the electric grid.

In Concept E, the electric generator is a synchronous generator excited by an external exciter, and wherein the electric converter system comprises a Dynamic Voltage Restoring circuit. Compared to Concept D, Concept E can provide a simplified DC to DC converter arrangement, Especially, the Dynamic Voltage Restoring circuit may be located inside the nacelle. Especially, the electrolyzer may be arranged inside the nacelle or inside the tower. Especially, the electric converter system is arranged to generate the DC electric power output for powering the electrolyzer at a Medium Voltage DC level or at a Low Voltage DC level.

In Concept F, the electric generator is a synchronous generator, and wherein the electric converter system comprises a modular converter with a plurality of converter modules, and wherein each of the plurality of converter modules is arranged to generate a DC electric power output for powering respective electrolyzer modules. Concept F is advantageous due to the modular converter and electrolyzer, thereby allowing an easy up-scaling and use of standard components for a variety of system ratings. Especially, the electric converter system is arranged to generate the DC electric power output for powering the electrolyzer at a Medium Voltage DC level or a Low Voltage DC level.

In Concept G, the electric generator is a synchronous generator, and wherein the electric converter comprises one transformer with one primary winding and a plurality of secondary windings, each being connected to a thyristor based rectifier to generate a DC electric power output for powering an electrolyzer module. Concept G is advantageous due to a very simple and robust power architecture.

A plurality of off-grid wind turbines according to the first aspect may be arranged so that hydrogen outputs from each of the plurality of wind turbines are connected to one common hydrogen storage system.

In a second aspect, the invention provides a method for storing energy based on wind power, the method comprising
generating an initial electric power output by means of an electric generator in a wind turbine comprising a tower, a nacelle, and a blade system arranged to drive the electric generator,
converting the initial electric power output into a DC electric power output dedicated for powering a hydrogen electrolyzer,
generating hydrogen by applying the DC electric power output to the hydrogen electrolyzer, wherein at least part of the hydrogen electrolyzer is located inside the wind turbine, and
storing the generated hydrogen in a hydrogen storage tank.

In one embodiment, the method comprises the step of providing the hydrogen electrolyzer inside the nacelle. More specifically, providing a pipe system inside the tower for transporting generated hydrogen from the nacelle and down tower.

It is to be understood that the same advantages and preferred embodiments and features apply for the second aspect, as described for the first aspect, and the aspects may be mixed in any way.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
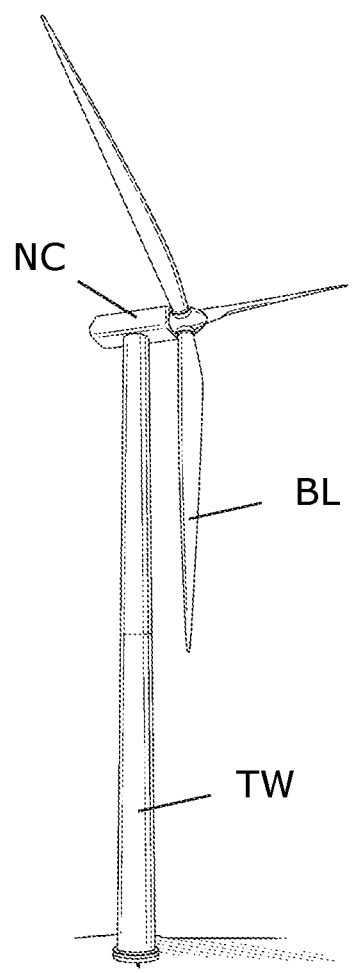
FIG. 1 illustrates a wind turbine.

FIG. 1 illustrates a wind turbine system embodiment. The wind turbine has at least two, e.g. three rotor blades BL for driving an electric generator located inside the nacelle NC on top of a tower TW. Typically, a power converter system in a wind turbine can be placed in the nacelle NC or inside the tower TW. Wind turbines may generate an electric power of at least 1 MW, such as 240 MW, or more. The electric power converter system of the wind turbine may be configured to generate a dedicated DC power for powering a hydrogen electrolyzer at a DC voltage within the range +/−500 VDC to +1-50 kVDC range. Especially, a DC voltage range of +/−2 to +/−10 kVDC may be preferred.

FIGS. 2a-2d illustrate block diagrams of various examples of location of components in relation to the off-grid wind turbine WT. An electric generator G driven by a blade system generates an initial electric power output ACV, typically an AC voltage. An electric converter CNV converts the initial electric power from the generator G into a dedicated DC voltage DCV for powering the hydrogen electrolyzer ELT which produces hydrogen H based on a water input W according to an electrolysis process.

Figure 2A:
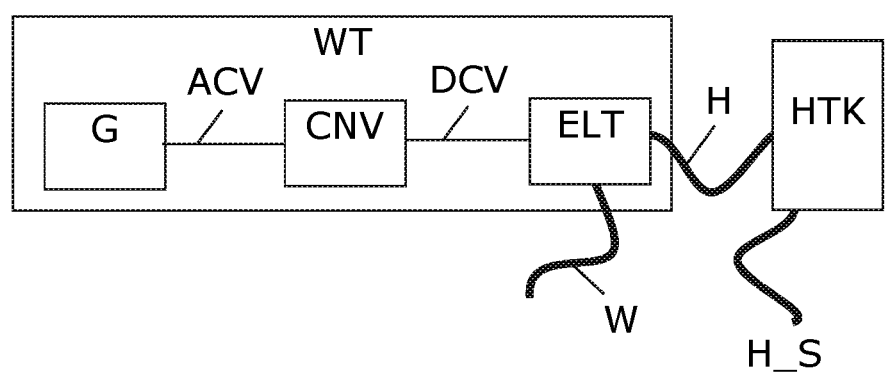
FIGS. 2a-2d illustrate block diagrams of various examples of location of the electric converter, the hydrogen electrolyzer and the hydrogen tank in relation to the wind turbine.

Via a pipe, the produced hydrogen H is transferred for storage in a hydrogen tank HTK system for later tapping of stored hydrogen H_S, e.g. for powering hydrogen driven vehicles or other fuel cell driven applications. E.g. the storage tank HTK can be connected to provide hydrogen H_S via a pipe system to larger storage tanks, or hydrogen can be transported by vehicles for use at other locations. The hydrogen tank HTK may in principle be located inside the tower of the wind turbine WT, however adjacent to the wind turbine tower, e.g. on the ground at a distance of 2-100 m away from the wind turbine tower. Alternatively, the hydrogen tank HTK may be placed remotely to the wind turbine, i.e. more than 100 m away from the wind turbine tower. Still further, the hydrogen tank HTK may be located in the ground, e.g. below the wind turbine tower, FIG. 2a shows an embodiment where the converter CNV and the electrolyzer ELT are located inside the wind turbine WT, i.e. in the space provided inside the nacelle and inside the tower. The hydrogen storage tank HTK is located outside the wind turbine WT.

Figure 2B:
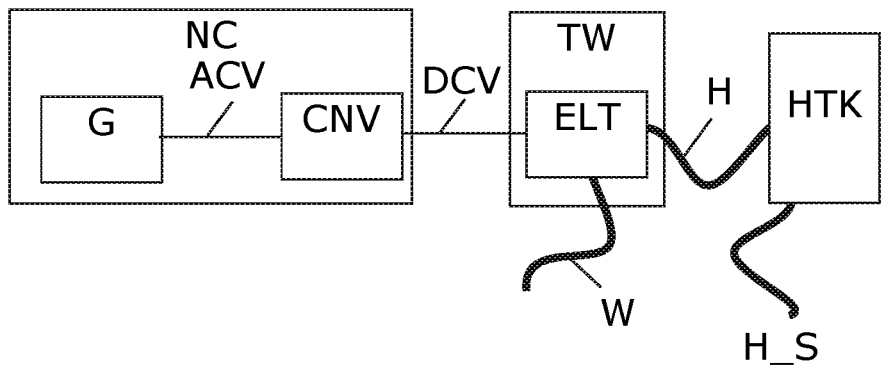

FIG. 2b shows an embodiment where the converter CNV is located inside the nacelle NC, while the hydrogen electrolyzer ELT is located inside the tower, e.g. on the ground inside the tower. The hydrogen tank HTK is located adjacent to the wind turbine tower TW.

Figure 2C:
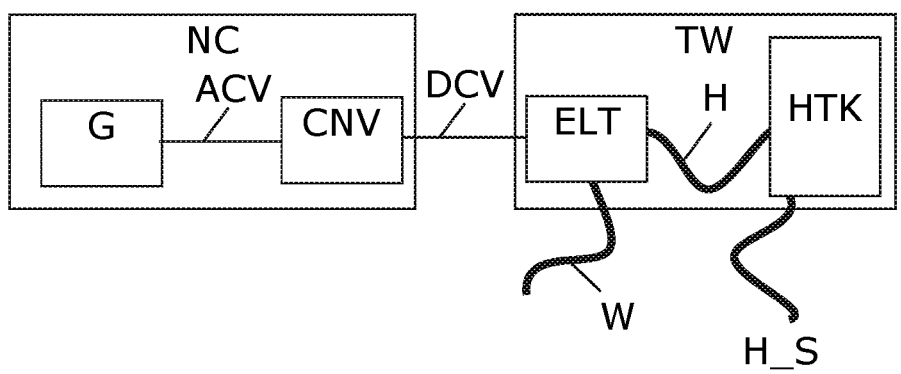

FIG. 2c shows an embodiment differing from the embodiment of FIG. 2b in that the hydrogen tank HTK is located inside the tower TW along with the electrolyzer ELT. E.g. the electrolyzer ELT and the tank HTK may be integrated to provide one unit.

Figure 2D:
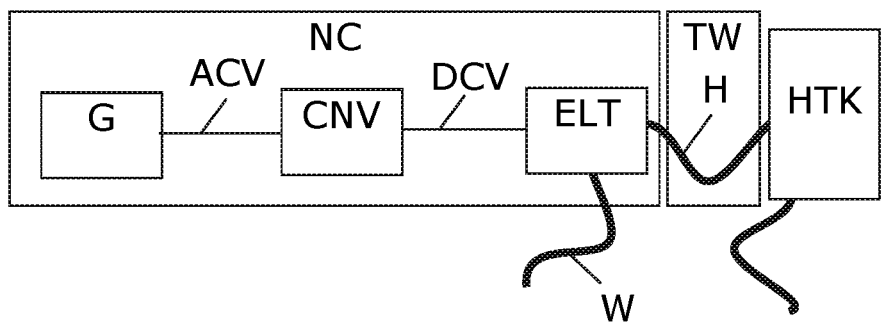

FIG. 2d shows an embodiment where both of the converter CNV and the electrolyzer ELT are located inside the nacelle NC, A pipe in the tower TW leads produced hydrogen H to the hydrogen tank HTK which is located adjacent to the tower TW, e.g. on the ground or in the ground.

In the following, various concepts for power architectures to provide the dedicated DC voltage for powering the hydrogen electrolyzer.

Figure 3A:
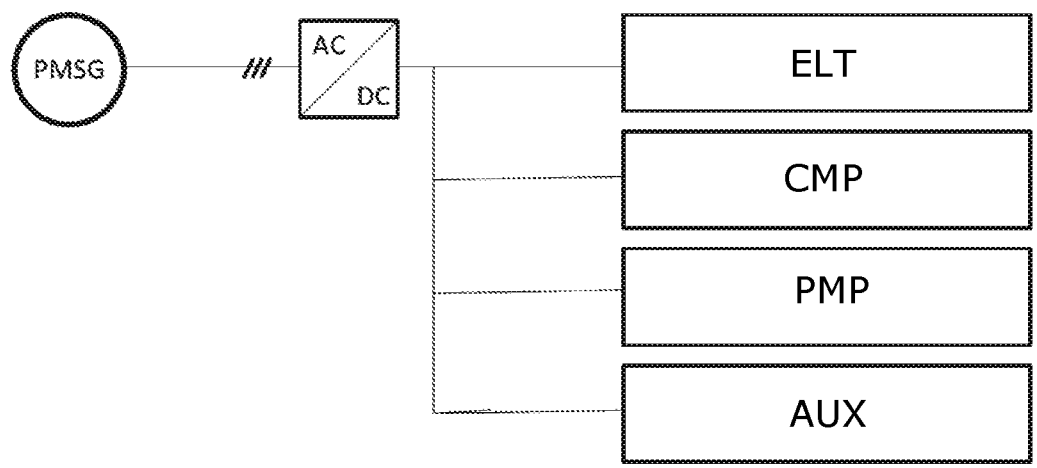
FIGS. 3a-3d illustrates various implementations of Concept A.
Figure 3B:
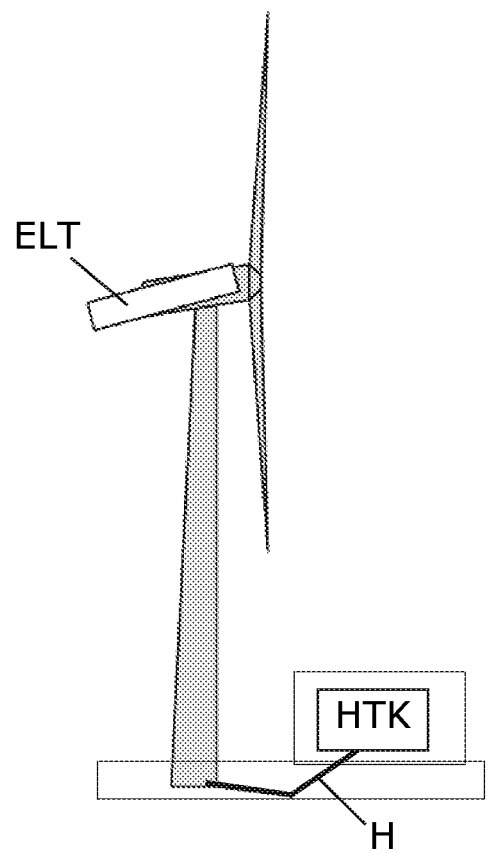

FIG. 3a illustrates a block diagram of an embodiment of Concept A, where a permanent magnet type synchronous generator PMSG provides an initial AC output which is converter by an AC to DC converter into a DC voltage dedicated for powering the hydrogen electrolyzer ELT. Further, the DC voltage serves to power a compressor CMP for compressing the produced hydrogen, a pump PMP for pumping produced hydrogen, and finally auxiliary equipment AUX which includes e.g. all necessary equipment for normal operation of the wind turbine, e.g. computer system and vital electric motors for control of the blade system etc. Thus, in principle the wind turbine can operate without any connection to an electric grid, even though it may be preferred that the auxiliary equipment AUX can be power from the electric grid in cases where the wind turbine generator PMSG can not provide sufficient power, e.g. at shut down, FIG. 3b shows a sketch of one configuration of Concept A, where the electrolyzer ELT is located inside the nacelle along with the AC to DC converter, while the produced hydrogen H is transferred to the storage tank HTK located on the ground adjacent to the tower in a separate housing.

Figure 3C:
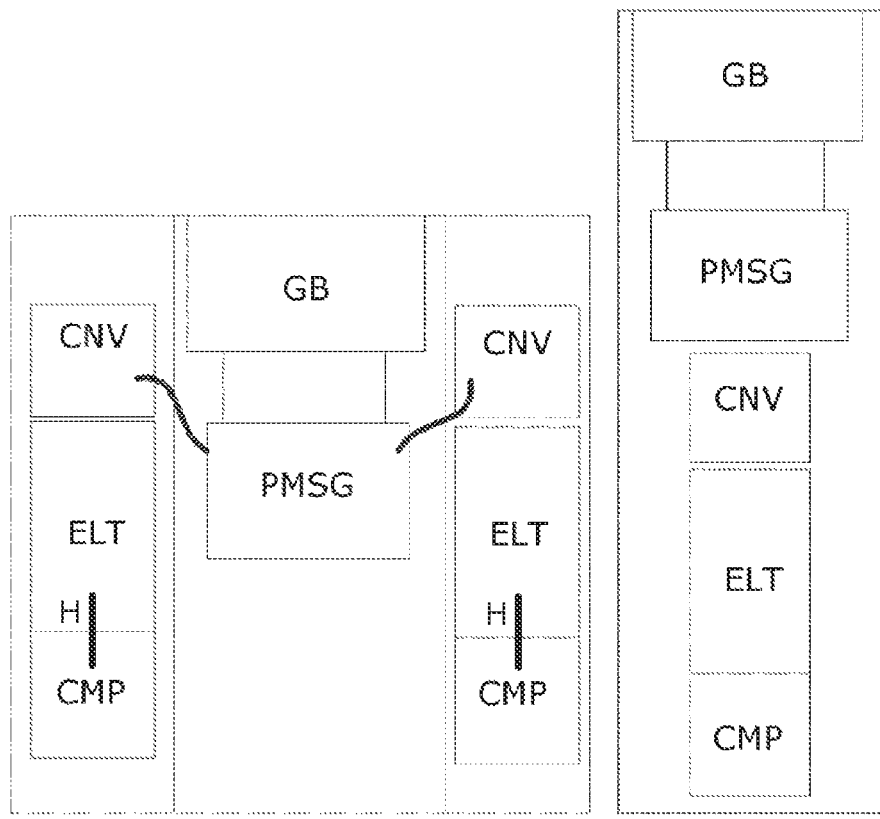

FIG. 3c shows two possible layouts of nacelle for Concept A. To the left, location of gearbox GB and generator PMSG are in the centre, while two identical units are located in the sides of the nacelle. Each of these units are formed by an AC to DC converter CNV, a hydrogen electrolyzer ELT and a compressor CMP for compressing hydrogen produced by the electrolyzer ELT.

To the right, an alternative configuration is shown, where one single unit as described above is located in line with the gearbox GB and generator PMSG, thus allowing a narrow nacelle design.

Figure 3D:
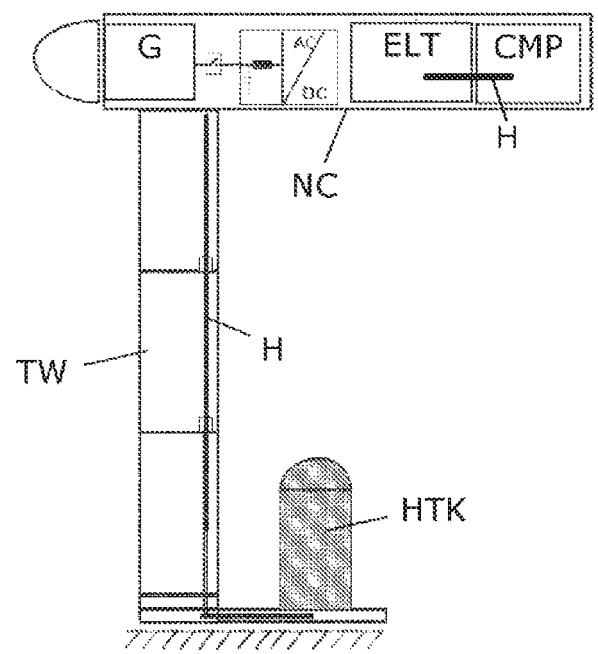

FIG. 3d shows location of components in an embodiment of Concept A, in the nacelle NC, the generator G is connected electrically via a filter to the AC to DC converter which generates the DC voltage for driving the electrolyzer ELT. The compressor CMP provides a sufficient hydrogen pressure for leading H via pipes to the tank HTK located on the ground adjacent to the tower TW.

Figure 4:
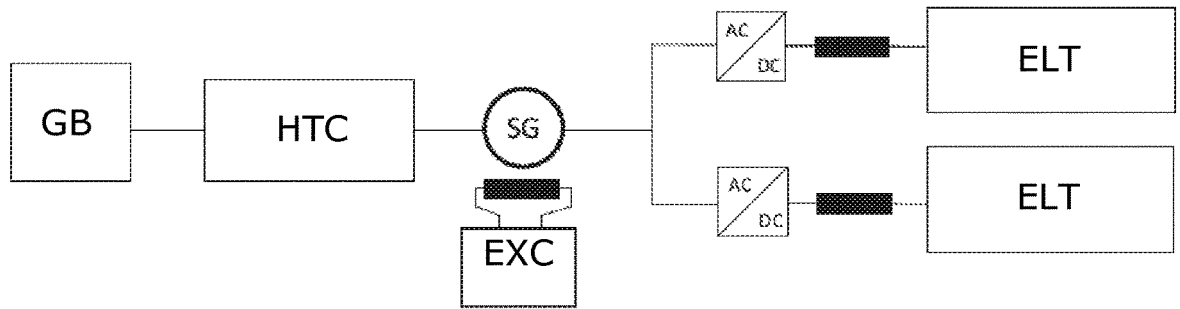
FIG. 4 illustrates Concept B.

FIG. 4 illustrates Concept B, where a hydraulic torque converter HTC inserted between the blade system via a gearbox GB for driving the electric generator which is a synchronous generator SG excited by an external exciter EXC. The generator SG provides a controllable AC voltage which is converter by an AC to DC converter for powering the electrolyzer ELT, here as an example two separate branches of converter and electrolyzers are shown. The use of the torque HTC converter and the exciter system EXC allows use of a simple and efficient electric AC to DC converter system, as it provides constant speed and variable torque to the synchronous generation, leading thus to simple diode implementation of the AC to DC converter system. The location of components in Concept B can be as described e.g. in FIGS. 3c and 3d for Concept A.

Figure 5:
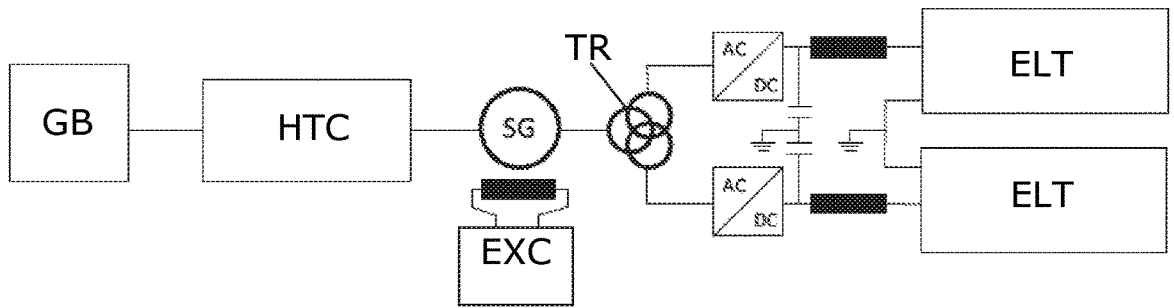
FIG. 5 illustrates Concept C.

FIG. 5 illustrates an embodiment of Concept C, which is similar to Concept B except for the use of a transformer TR between the generator SG and the AC to DC converter. Especially, this can be combined with the use of an AC to DC converter with passive diodes. Concept C is suitable for Medium Voltage levels and can thus handle higher electric power levels (up to 15 MW and more) compared to Concept B which is best suited for Low Voltage levels and lower power levels.

Figure 6:
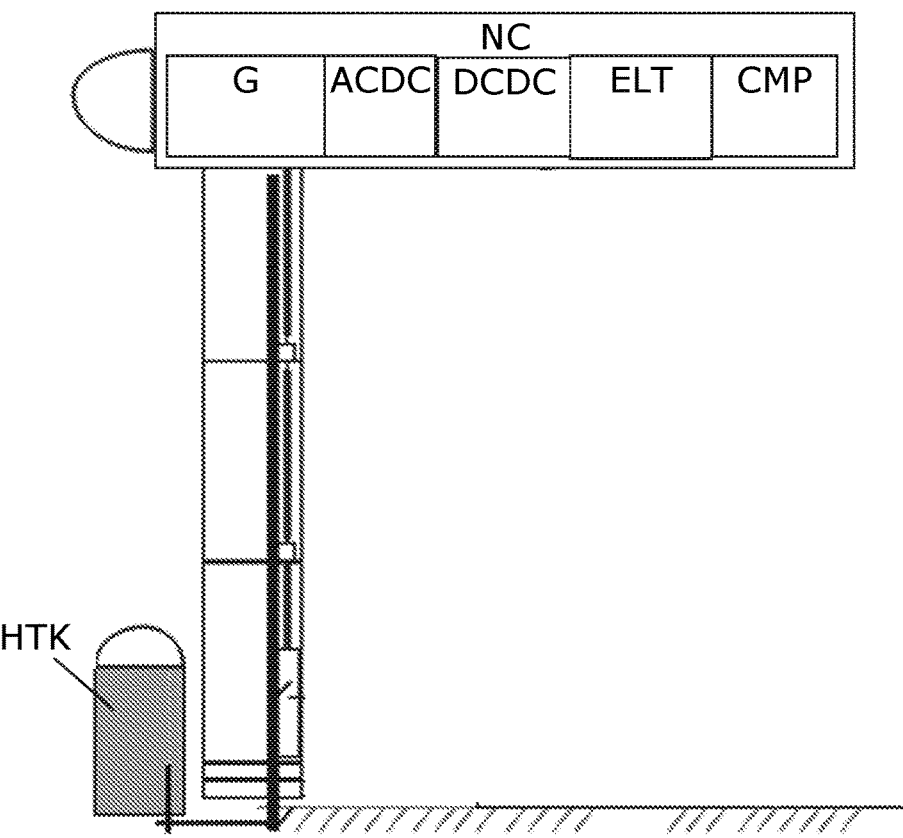
FIG. 6 illustrates Concept D.

FIG. 6 illustrates an embodiment of Concept D, which differs with respect to the AC to DC converter system, namely in that an intermediate AC to DC converter ACDC converts the AC voltage from the generator G into an intermediate DC voltage which is then converted into the dedicated DC voltage for powering the electrolyzer ELT by a DC to DC converter DCDC. A compressor CMP provides the necessary pressure for transfer of the produced hydrogen via a pipe in the tower down to a hydrogen storage tank HTK located on the ground adjacent to the tower. The nacelle NC houses all of: the generator G, the converter system ACDC, DCDC, and the electrolyzer system ELT, CMP. Alternatively, the DC to DC converter DCDC may be used to up-convert the DC voltage level to a Medium Voltage level, and in that case, the electrolyzer ELT may more preferably be located inside the tower. Further, the electrolyzer ELT located in the nacelle may be powered by the intermediate DC voltage generated by the AC to DC converter ACDC, while the DC to DC converter DCDC serves to provide a Medium Voltage DC level to allow for generation of a low loss connection to grid.

Figure 7A:
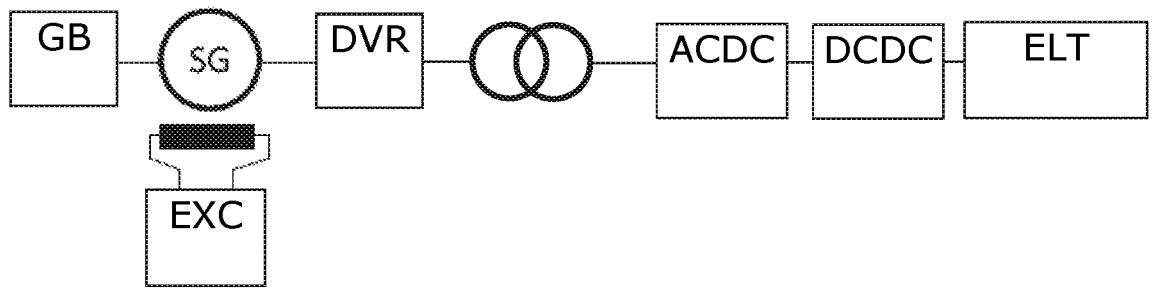
FIGS. 7a-7d illustrate various implementations of Concept E.

FIG. 7a illustrates an embodiment of Concept E, where a synchronous generator SG excited by an external exciter generates an initial AC voltage. In Concept E, a Dynamic Voltage Restoring circuit DVR forms part of the converter system, as well as a low frequency transformer which provides an AC voltage output to an AC to DC converter ACDC followed by a DC to DC converter DCDC, This architecture involving a DVR allows generation of a Medium Voltage level DC voltage for powering the electrolyzer ELT.

Figure 7B:
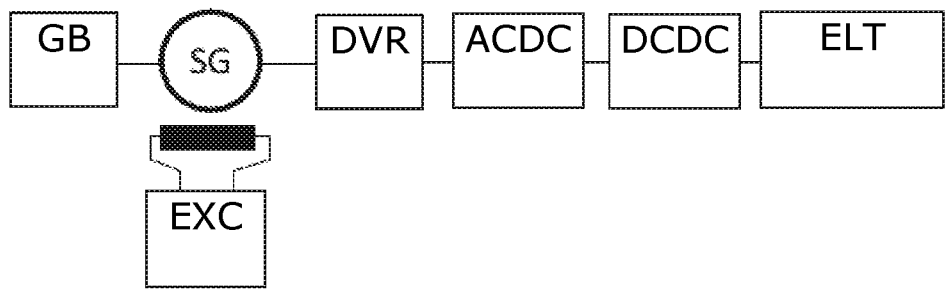

FIG. 7b illustrates a variant of Concept E, which is similar to the embodiment in FIG. 7a, except that the transformer is eliminated.

Figure 7C:
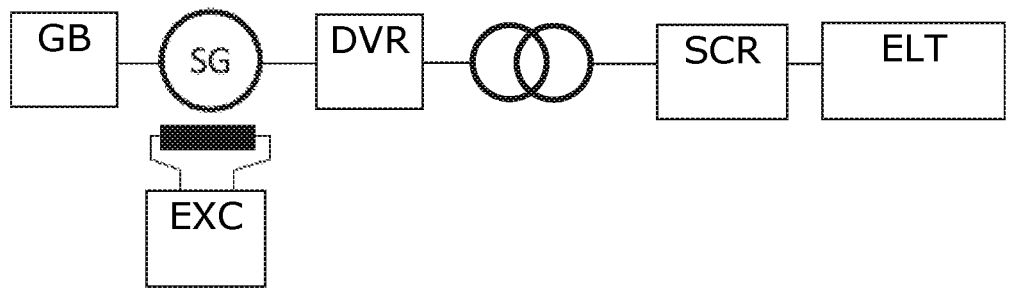
Figure 7D:
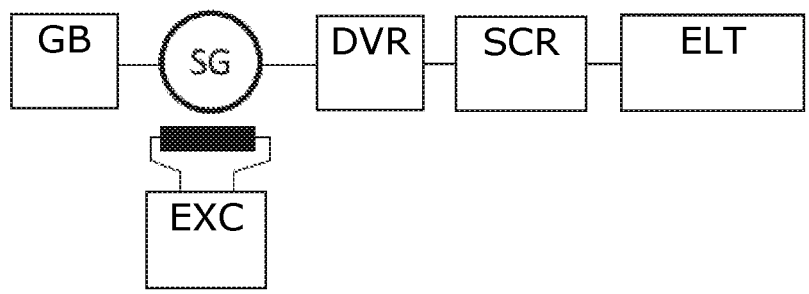

FIG. 7c illustrates another variant of Concept E, similar to the embodiment in FIG. 7a except that the AC to DC and DC to DC converters are eliminated and replaced by a silicon controlled rectifier SCR. Thus, the use of the DVR allows a rather simple conversion by means of a transformer and a rectifier in the form of an SCR, FIG. 7d illustrate yet another variant of Concept E, namely similar to the embodiment of FIG. 0.7c, except that the transformer is eliminated, thereby providing a very simple architecture.

For concept E, it is understood that the converter system as well as the electrolyzer may be located in the nacelle, however it may be preferred that the electrolyzer is located inside the tower. Further, both the converter system and the electrolyzer may be located inside the tower.

Figure 8A:
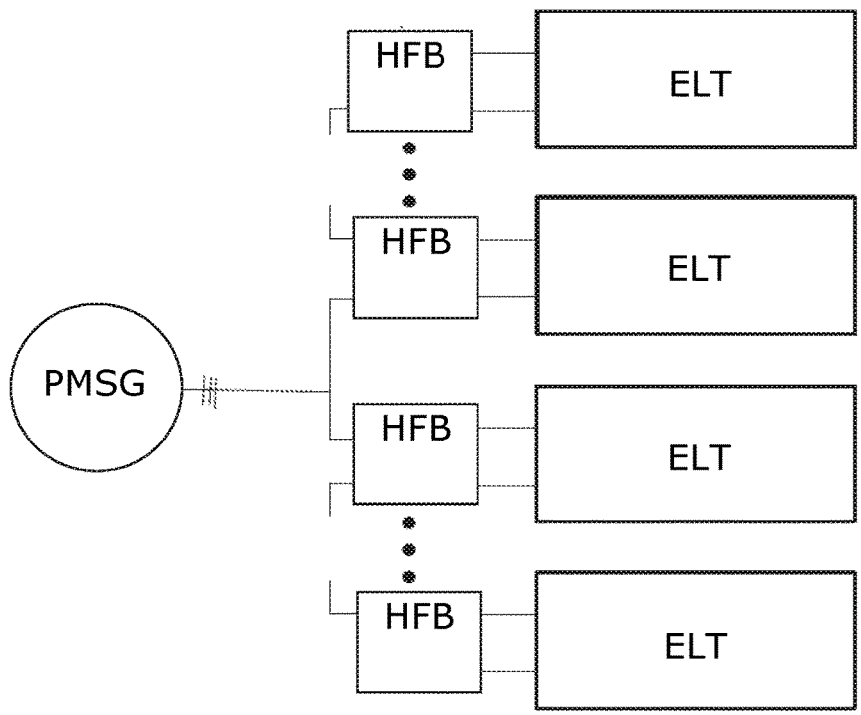
FIGS. 8a and 8b illustrate implementations of Concept F, FIGs.
Figure 8B:
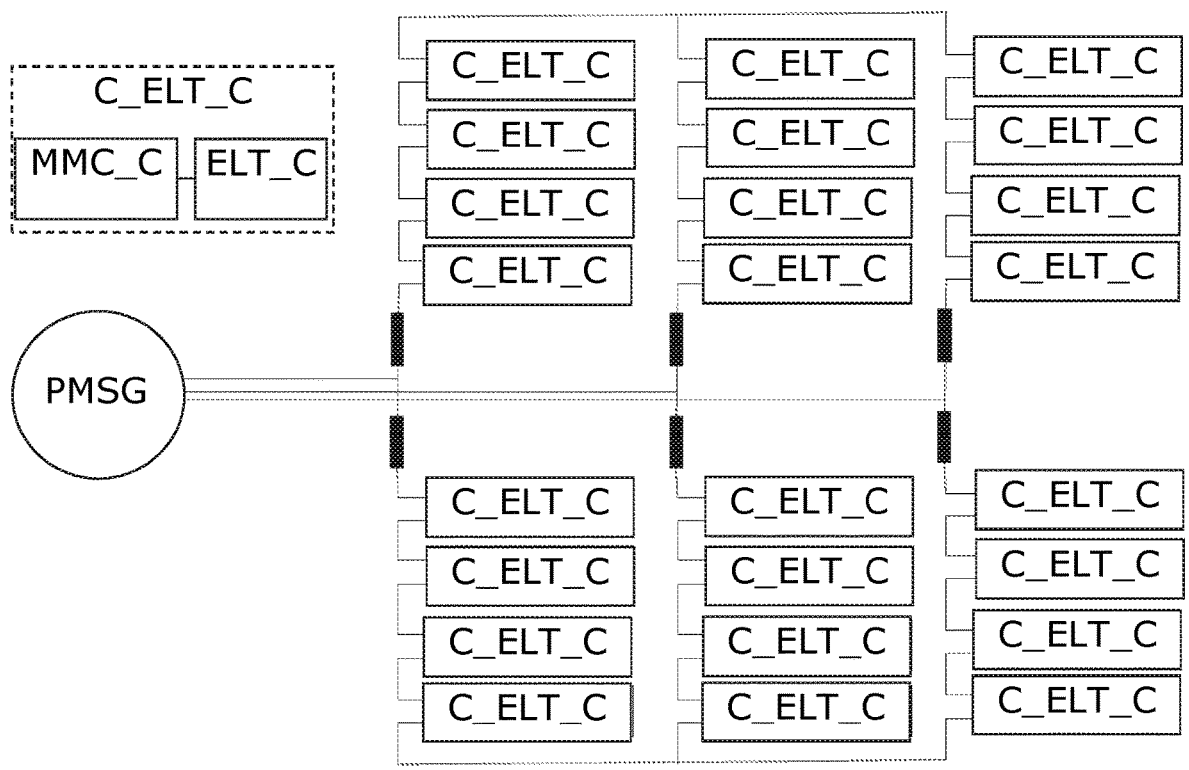

FIGS. 8a and 8b illustrate implementation examples of Concept F, where electric generator is a synchronous generator PMSG, e.g. a permanent magnet type synchronous generator, and wherein the electric converter system is a modular converter with a plurality of converter modules, and wherein each of the plurality of converter modules is arranged to generate a DC electric power output for powering respective electrolyzer modules. Such architecture allows low cost large scale manufacturing of rather small converter and electrolyzer modules, which can easily be combined to allow easy scaling to match a given electric voltage or power rating, FIG. 8a illustrates one embodiment of Concept F, where the AC voltage generated by the generator PMSG is applied to a series connection of a plurality of converters in the form of half or full bridges HFB each generating a DC voltage for powering an electrolyzer module ELT.

FIG. 8b illustrates another embodiment of Concept F, where sets of a number of series connected modules C_ELT_C are connected to the output phases of the electric generator PMSG. Each module C_ELC_C, as illustrated to the left in the dashed box, is formed by a modular multilevel converter cell MMC_C and an electrolyzer cell ELT_C.

Figure 9:
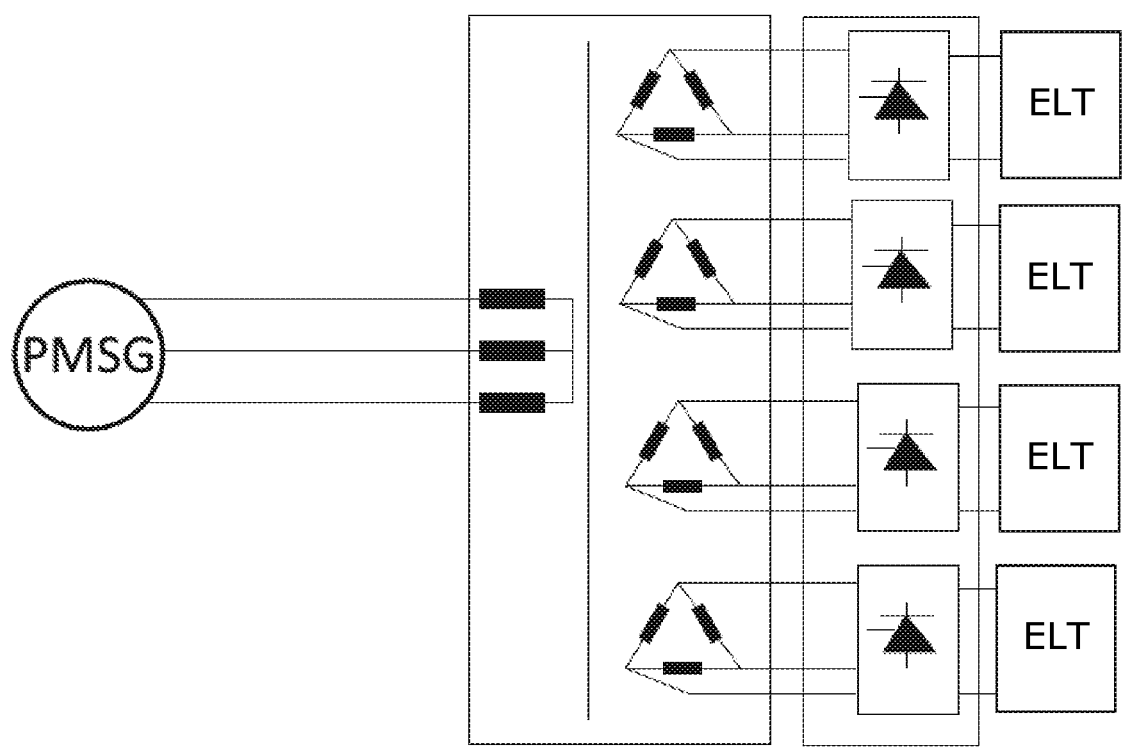
FIG. 9 illustrates Concept G, and FIG. 10 illustrate steps of a method embodiment.

It is to be understood that the converter and electrolyzer modules according to Concept F can be located inside the nacelle or inside the tower. Further, some modules may be located inside the nacelle and some modules can be located inside the tower, FIG. 9 illustrates an embodiment of Concept G, where the electric generator PMSG is a synchronous generator, e.g. a permanent type synchronous generator, and wherein the electric converter comprises one transformer with one primary winding and a plurality of secondary windings connected each to a thyristor based rectifier, each being arranged to generate a DC electric power output for powering an electrolyzer module. This provides a rather simple and robust architecture. In the illustration, all three phases of the generator PMSG are transformed by respective transformers and rectified to arrive at DC voltages for powering respective electrolyzer modules. The electrolyzer module may be located inside the nacelle or inside the tower. Further, some electrolyzer modules may be located inside the nacelle, while some electrolyzer modules are located inside the tower.

Figure 10:
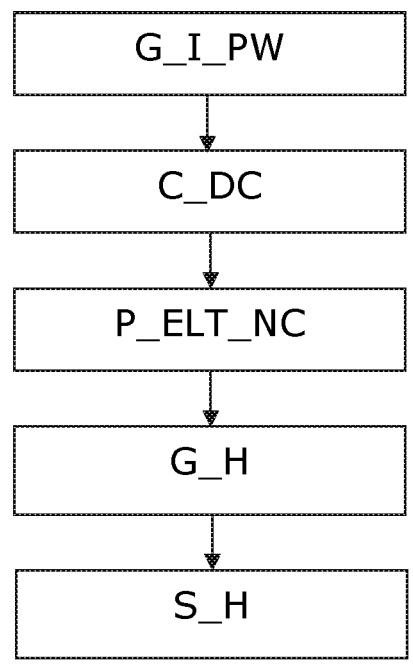

FIG. 10 illustrate steps of a method embodiment, namely steps of a method for storing energy based on wind power. In a first step, an initial electric power output is generated G_I_P by means of an electric generator in a wind turbine comprising a tower, a nacelle, and a blade system arranged to drive the electric generator. Next, converting C_DC the initial electric power output into a DC electric power output dedicated for powering a hydrogen electrolyzer. Next, providing a hydrogen electrolyzer in the nacelle P_ELT_NC of the wind turbine, and next generating G_H hydrogen by applying the DC electric power output to the hydrogen electrolyzer in the nacelle. Finally, storing S_H the generated hydrogen in a hydrogen storage tank.

To sum up: the invention provides an off-grid wind turbine system comprising a wind turbine with an electric generator (G) for generating an initial electric power output (AC). An electrolyzer system with a hydrogen electrolyzer (ELT) located inside the nacelle or tower of the wind turbine, so as to generate hydrogen (H) by an electrolysis process. An electric converter system (CNV) serves to convert the initial electric power output (AC) into a DC electric power output (DC) dedicated for powering the electrolyzer (ELT). The produced hydrogen (H) is stored in a hydrogen storage tank (HTK), e.g. located adjacent to the wind turbine. Modules each comprising a converter and an electrolyzer may be stacked to provide the necessary capacity. In some embodiment, a synchronous generator excited by an external exciter (EXC) is used, and in some embodiments a hydraulic torque converter (HTC) is used. In some embodiments an AC to DC converter system involving transformer is used, while in other embodiments an intermediate DC to DC converter is used. By placing the electrolyzer (ELT) inside the wind turbine, a dedicated and compact wind turbine is provided which allows a rather simple and low cost wind turbine especially suited for storing energy in the form of hydrogen based on wind.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An off-grid wind turbine system comprising:
    a wind turbine comprising a tower, a nacelle, and a blade system arranged to drive an electric generator for generating an initial electric power output;
    an electrolyzer system comprising an electrolyzer arranged to generate hydrogen to a hydrogen output by an electrolysis process, wherein at least part of the electrolyzer is located inside the wind turbine;
    an electric converter system arranged to convert the initial electric power output into a DC electric power output dedicated for powering the electrolyzer; and
    a hydrogen storage system comprising a hydrogen storage tank arranged to receive hydrogen from the hydrogen output in order to store hydrogen generated by the electrolyzer system, and
    wherein the DC electric power output powers a compressor located inside the wind turbine, wherein the compressor is connected to the hydrogen output and the compressor is operable to compress hydrogen from the hydrogen output; and wherein the electric generator is a synchronous generator, and wherein the electric converter system comprises a modular converter with a plurality of converter modules, and wherein each of the plurality of converter modules is arranged to generate a DC electric power output for powering respective electrolyzer modules.

2. The off-grid wind turbine system according to claim 1, wherein the electric converter system is arranged to convert the initial electric power output from the electric generator into the DC electric power output dedicated for powering the electrolyzer in one single conversion step.

3. The off-grid wind turbine system according to claim 1, wherein the initial electric power output from the electric generator is an AC output.

4. The off-grid wind turbine system according to claim 1, wherein the electric generator is a synchronous generator excited by an external exciter.

5. The off-grid wind turbine system according to claim 1, wherein the electrolyzer is located inside the nacelle.

6. The off-grid wind turbine system according to claim 1, wherein the hydrogen storage tank is located adjacent to the wind turbine.

7. The off-grid wind turbine system according to claim 1, wherein the wind turbine is located off-shore, and wherein the hydrogen storage tank is located on-shore.

8. The off-grid wind turbine system according to claim 1, wherein an AC to DC converter serves to convert the initial electric power output from the electric generator into the DC electric power output for powering the electrolyzer, and wherein both of the AC to DC converter and the electrolyzer are located inside the nacelle.

9. The off-grid wind turbine system according to claim 1, comprising a torque converter mechanically connected between the blade system and the electric generator, wherein the electric generator is a synchronous generator excited by an external exciter, and wherein the electrolyzer and the electric converter system are located inside the nacelle.

10. The off-grid wind turbine system according to claim 9, wherein the electric converter system comprises a series connection of a transformer and an AC to DC converter.

11. The off-grid wind turbine system according to claim 1, wherein the electric converter system comprises an AC to DC converter arranged to convert the initial electric power output from the electric generator into an intermediate DC electric power output, and wherein a DC to DC converter serves to convert the intermediate DC electric power output into the DC electric power output for powering the electrolyzer.

12. The off-grid wind turbine system according to claim 1, wherein the electric generator is a synchronous generator excited by an external exciter, and wherein the electric converter system comprises a Dynamic Voltage Restoring circuit.

13. The off-grid wind turbine system according to claim 1, wherein the electric generator is a synchronous generator, and wherein the electric converter system comprises a transformer with a plurality of secondary windings, each of the secondary windings being connected to a rectifier to generate a DC electric power output for powering an electrolyzer module.

14. A method for storing energy based on wind power, the method comprising:
    generating an initial electric power output by an electric generator in a wind turbine comprising a tower, a nacelle, and a blade system arranged to drive the electric generator;
    converting, using an electric converter system, the initial electric power output into a DC electric power output dedicated for powering an electrolyzer;
    generating hydrogen by applying the DC electric power output to the electrolyzer, wherein at least part of the electrolyzer is located inside the wind turbine; and storing the generated hydrogen in a hydrogen storage tank, and wherein the DC electric power output powers a compressor located inside the wind turbine, wherein the compressor is connected to a hydrogen output of the electrolyzer and the compressor is operable to compress hydrogen from the hydrogen output; and wherein the electric generator is a synchronous generator, and wherein the converting method comprises a modular converter with a plurality of converter modules, and wherein each of the plurality of converter modules is arranged to generate a DC electric power output for powering respective electrolyzer modules.

15. The method according to claim 14, wherein the converting is done in one single conversion step.

16. The method according to claim 14, wherein the initial electric power output from the electric generator is an AC output.

17. The method according to claim 14, wherein the electric generator is a synchronous generator excited by an external exciter.

18. The method according to claim 14, wherein the electrolyzer is located inside the nacelle.

19. The off-grid wind turbine system according to claim 1, wherein an AC to DC converter of the electric converter system serves to convert the initial electric power output from the electric generator into the DC electric power output, and wherein the AC to DC converter and at least part of the electrolyzer are integrated so as to form one unit.

* * * * *